Sept. 18, 1956

H. T. WHITE 2,763,214

MOTOR DRIVEN PUMPS

Filed Dec. 17, 1953

INVENTOR.
HOWARD T. WHITE
BY
ATTORNEY.

Sept. 18, 1956  H. T. WHITE  2,763,214
MOTOR DRIVEN PUMPS

Filed Dec. 17, 1953  2 Sheets-Sheet 2

INVENTOR.
HOWARD T. WHITE
BY
B.T. Wolbersmith
ATTORNEY.

ated Sept. 18, 1956

United States Patent Office

2,763,214

MOTOR DRIVEN PUMPS

Howard T. White, Melrose Park, Pa.

Application December 17, 1953, Serial No. 398,776

10 Claims. (Cl. 103—87)

This invention relates to motor driven pumps.

It is the principal object of the present invention to provide a motor driven pump which is compact, is light in weight, is capable of operation in any position and is particularly suited for the pumping of flammable liquids.

It is a further object of the present invention to provide a motor driven pump having improved provisions for cooling by the liquid being pumped.

It is a further object of the present invention to provide a motor driven pump having the motor constructed as a cartridge type unit for insertion in the motor housing.

It is a further object of the present invention to provide a motor driven pump having improved provisions for isolating the motor stator from contact with the liquid being pumped while at the same time providing for adequate cooling of the motor stator.

It is a further object of the present invention to provide a motor driven pump of the character aforesaid having provisions for concurrently cooling the motor rotor and lubricating the rotor bearings.

Other objects and advantageous features of the invention will be apparent from the specification and claims.

The nature and characteristic features of the invention will be more readily understood from the following description, taken in connection with the accompanying drawings forming part thereof, in which.

Figure 1:
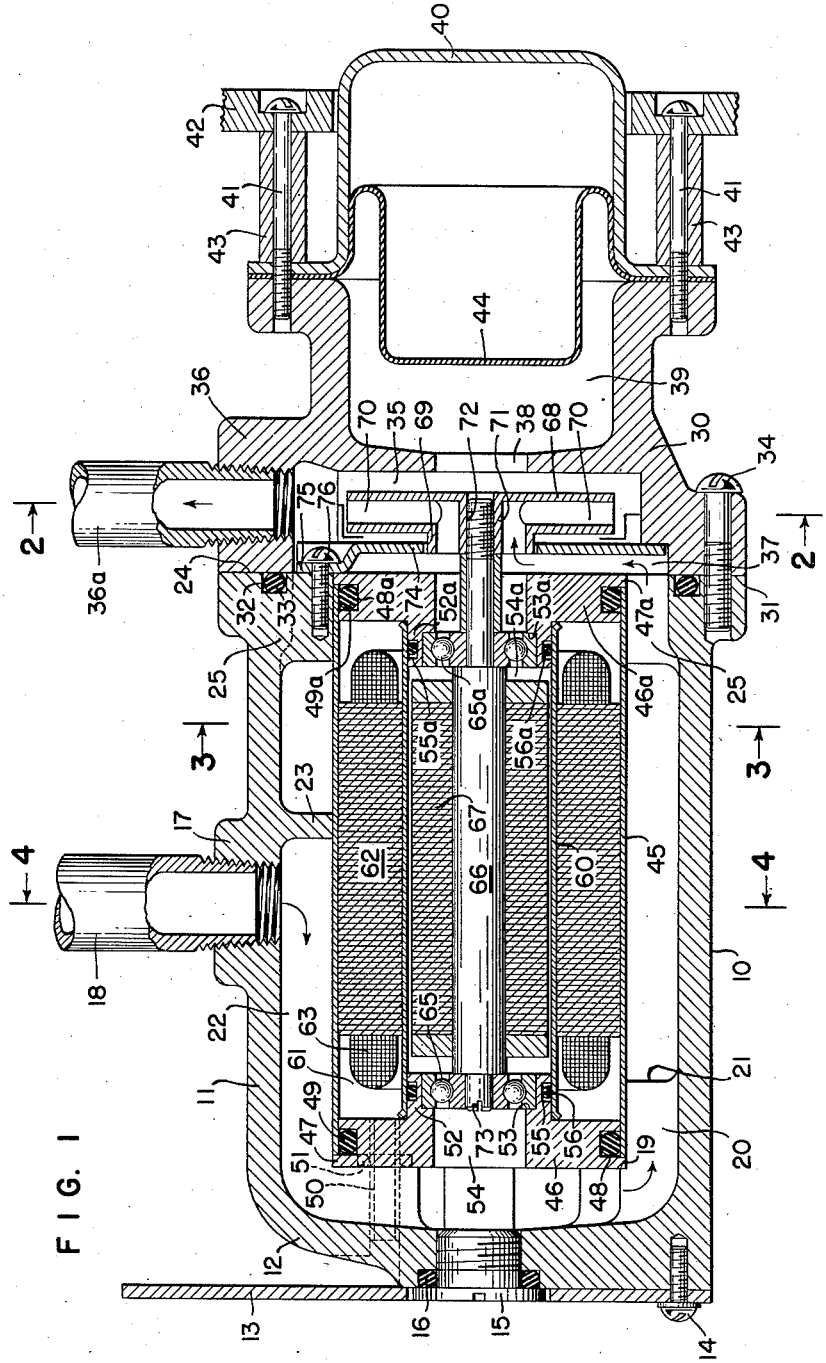
Figure 1 is a longitudinal sectional view of a preferred embodiment of a motor driven pump in accordance with the invention.
Figure 2:
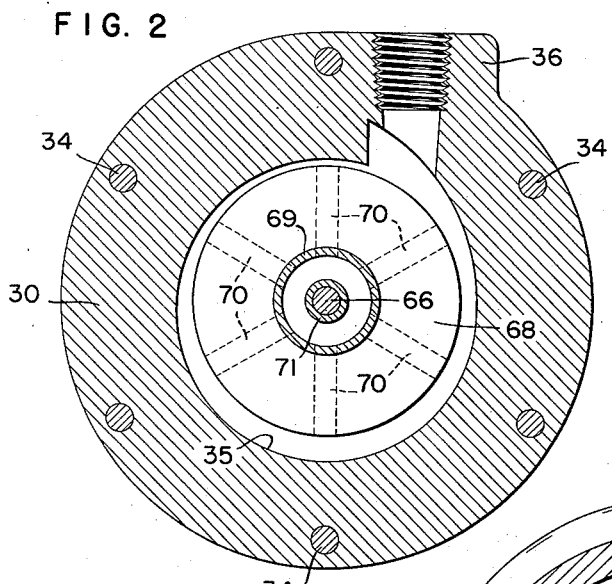
Fig. 2 is a transverse sectional view taken approximately on the line 2—2 of Fig. 1.
Figure 3:
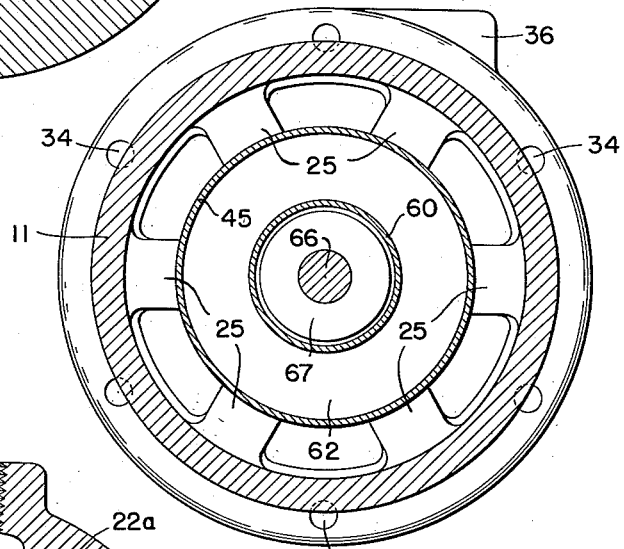
Fig. 3 is a transverse sectional view taken approximately on the line 3—3 of Fig. 1.
Figure 4:
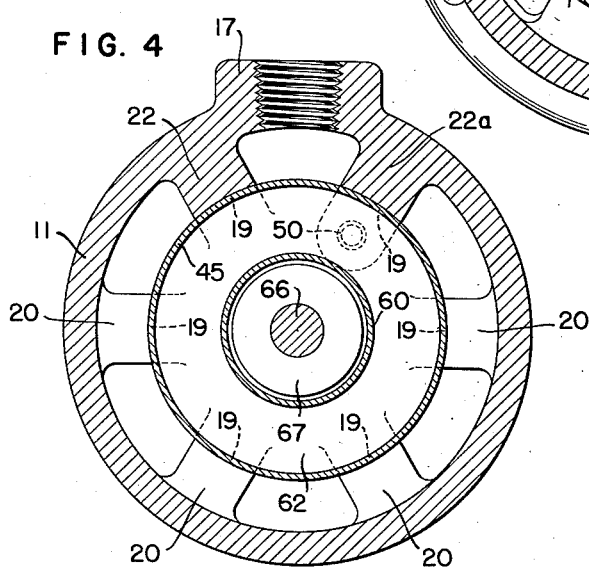
Fig. 4 is a transverse sectional view taken approximately on the line 4—4 of Fig. 1.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, a motor housing 10 is provided preferably having an outer cylindrical side wall 11 and an end wall 12. The end wall 12 may have a mounting plate 13 secured thereto in any desired manner such as by screws 14. While the housing 10 may be made of any desired material in accordance with the fluid to be handled for certain types of use it is preferably made of aluminum or other light material.

The end wall 13 may have a closure plug 15 in threaded engagement therewith, sealed by a sealing member 16 of any desired type, such as an O-ring.

The interior of the motor housing 10 is hollow and intermediate the ends the motor housing 10 is provided with a fluid inlet connection 17 to which a fluid supply pipe 18 is connected.

Extending axially from the end wall 12 and integral therewith and with the side wall 11, a plurality of circumferentially spaced radial end ribs 20 are provided having shoulders 19. The ribs 20 have inner end faces 21 disposed in the same diametral plane. A pair of spaced elongated ribs 22 and 22a are provided, extending axially from the end wall 12 and integral therewith and with the side wall 11. The ribs 22 extend beyond the fluid inlet connection 17 and are connected by a wall 23 to provide a passageway extending from the fluid inlet connection 17 to the interior of the end wall 12. The ribs 22 and 22a have shoulders 19.

The motor housing 10 has a transverse or diametrical flat end face 24 from which a plurality of circumferentially spaced radial ribs 25 extend axially inwardly.

The interior faces of the ribs 20, 22, 22a and 25 and of the wall 23 are in the same cylindrical surface for purposes to be explained.

A pump housing 30 is provided which may be made of the same material as the housing 10 and has a transverse or diametrical flat end face 31 held in engagement with the end face 24, one of the end faces, such as the end face 24, having an annular groove 32 therein for the reception of a sealing ring 33, such as an O-ring. The end face 31 is preferably held in engagement with the end face 24 by studs 34.

The pump housing 30 has an interior impeller chamber 35 which may be formed as a volute, with a fluid delivery connection 36 connected to a discharge pipe 36a and has a cylindrical chamber 37 axially disposed on one side of the chamber 35 and a port 38 axially disposed on the opposite side of a chamber 35. The pump housing 30, on the side opposite the end face 31, has a diaphragm chamber 39, the outer end of which is closed by a diaphragm housing 40 which is secured to the housing 30 by studs 41. The heads of the studs 41 are mounted in a supporting plate 42 and extend through spacer sleeves 43.

A flexible diaphragm 44 is interposed between the diaphragm housing 40 and pump housing 30 and is movable against the air confined within the housing 40 to accommodate pressure variations or pulsations in the pumped fluid, to smooth out the flow, and to provide for accommodating of any excessive pressure if used in a closed system.

The motor unit employed in connection with the present invention is preferably of the cartridge type and includes an outer cylindrical sleeve 45 for relatively tight engagement with the interior cylindrical faces of the ribs 20, 22, 22a and 25, and the wall 23.

At the end of the sleeve 45, contiguous to the end wall 12 of the motor housing 10, an end closure plate 46 is provided having a peripheral edge flange 47 against which the end of the sleeve 45 abuts. The end closure plate 46 has a peripheral groove 48 within which a sealing member 49, such as an O-ring, is disposed for engagement with the interior surface of the sleeve 45 to provide a fluid tight joint at this location. The end closure plate 46 is adapted to abut against the shoulders 19.

The end closure plate 46 may have a tube 50 secured therein and extending through the rib 22a and the end wall 12 for the reception of the conductors (not shown) for the motor stator. A sealing member 51, such as an O-ring may be provided in the outer face of the closure plate 46, surrounding the tube 50, and for engagement with the rib 22a to provide a fluid tight joint at this location.

The end closure plate 46 has an inner cylindrical extension 52 with an interior shoulder 53 and a central bore 54. On the periphery of the cylindrical extension 52, a groove 55 is provided for the reception of a sealing member 56, such as an O-ring.

At the opposite end of sleeve 45, an end closure plate 46a is provided, similar to the closure plate 46 but without any provisions for electrical conductors therethrough.

The end closure plate 46a has a peripheral edge flange 47a which abuts against the end of the sleeve 45, has a peripheral edge groove 48a with a sealing member 49a therein, has an inner cylindrical extension 52a with an interior shoulder 53a, a central bore 54a, a peripheral groove 55a and a sealing ring 56a.

An inner cylindrical sleeve 60 is provided, preferably of non-magnetic material, such as stainless steel, extending over and engaging the cylindrical extensions 52 and 52a, and with the sealing members 56 and 56a in engagement with the interior surface thereof to provide fluid tight seals at these locations. A motor stator chamber 61 is thus provided between the end closure plates 46 and 46a, and between the inner and outer sleeves 60 and 45, within which the motor field laminations 62 and field windings 63 are disposed in isolated condition and sealed from any contact by the liquid being pumped.

Within the cylindrical extensions 52 and 52a, and abutting against the shoulders 53 and 53a, respectively, the outer races of ball bearings 65 and 65a are provided, and an axial shaft 66 is mounted in the inner races of those bearings. The portion of the shaft 66, between the bearings 65 and 65a, is of larger diameter than the portions in the inner races of the bearings 65 and 65a to maintain the shaft 66 in position and has a motor rotor 67 mounted thereon. While the motor rotor 67 may be of any preferred type, for an alternating current motor it is preferred that the motor rotor 67 be of the short circuited type. It will be noted, also, that a motor rotor chamber is provided within the inner sleeve 60 and between the bearings 65 and 65a.

The shaft 66 extends axially through the bore 54a and has a fluid impeller 68 mounted thereon in the impeller chamber 35. The impeller 68 has an axially extending rim 69 which bounds the inlet passageway to the interior thereof, a plurality of outwardly or radially extending fluid passageways 70, and a mounting sleeve 71 which extends along the shaft 66 from the end thereof to the inner race of the bearing 65a and is provided with an interiorly threaded portion 72 for engagement with a complementally threaded portion of the shaft 66. The shaft 66, at the opposite end may have a screw driver slot 73 to aid in tightening the impeller 68 on the shaft 66, or loosening the same for removal.

A partition plate 74 is provided in the chamber 37, has a plurality of shoulders 75 for engagement at spaced locations with the end closure plate 46a, for holding the motor cartridge assembly in place. Studs 76 extend through the plate 74 and into the housing 10 at the locations of the shoulders 75. The inner marginal edge of the plate 74 is closely spaced with respect to the impeller rim 69.

The mode of operation will now be pointed out.

Upon energization of the windings 63, the motor rotor 67 is caused to rotate and thus rotate the shaft 66 on which the impeller 68 is mounted.

Fluid to be pumped is supplied through the fluid supply pipe 18 to the fluid inlet connection 17, is confined by the wall 23 and directed between the ribs 22, and between the outer sleeve 45 and the interior of the side wall 11 to the space at the end wall 12. The main portion of the fluid being pumped then passes along the exterior of the outer sleeve 45, as confined by the side wall 11, except for the directed flow of incoming fluid previously mentioned, towards the other end of the outer sleeve 45. The fluid is guided by the ribs 20 and 22 and by its contact with the ribs 20 and 22 and the sleeve 45 absorbs heat therefrom for cooling the motor stator elements 62 and 63.

At the other end of the sleeve 45 the fluid is guided by the ribs 25 into the chamber 37 and therefrom between the interior of the rim 69 and the exterior of the mounting sleeve 71 to the impeller passageways 70, and to the impeller chamber 35 for delivery through the fluid delivery connection 36 to the pipe 36a.

A portion of the fluid being pumped enters the bore 54, passes through the bearing 65, through the motor rotor chamber, around the motor rotor 67, through the bearing 65a, and the bore 54a and into the chamber 37 where it mingles with the main portion of the fluid. This portion of the fluid cools the motor rotor 67 and lubricates the bearings 65 and 65a.

Any pulsations in the pumping action of the impeller 68 are equalized by the change in positioning of the diaphragm 44.

The sealing of the motor stator chamber 61 prevents access thereto of fluid being pumped while the circulation of the fluid around the outer sleeve 45 provides effective cooling.

At the same time leakage from the junction between the motor housing 10 and the pump housing 30 is also obviated.

The motor unit may be readily removed for inspection or replacement by removing the pump housing 30, removing the impeller 68, and removing the studs 76 and plate 74.

I claim:

1. A motor driven pump comprising a motor housing having a side wall, a first end and a second end, said side wall having a passageway therein, a fluid inlet connection in communication with said passageway, a cylindrical sleeve spaced inwardly from the side wall and providing a boundary of said passageway for directing fluid flow from said first end, end closure members having outer cylindrical surfaces for supporting engagement with the ends of said sleeve, a second cylindrical sleeve spaced inwardly from said first sleeve, said end closure members having cylindrical surfaces concentric with but axially spaced from said outer cylindrical surfaces with which the ends of said second sleeve are in engagement, said end closure members having bearings therein providing a fluid flow path, the space between said sleeves and said closure members providing a motor stator chamber and the space in the interior of said inner sleeve providing a motor rotor chamber connected with said fluid flow paths, a pump housing connected to said motor housing and closing said second end, said pump housing having an impeller chamber and a fluid discharge connection connected to said impeller chamber, said pump housing having a fluid chamber therein with which said passageway and said impeller chamber are in communication, and a shaft carried by said bearings having a motor rotor thereon in said motor rotor chamber and a fluid impeller in said impeller chamber.

2. A motor driven pump comprising a motor housing having a side wall, a first end and a second end, said side wall having a passageway therein, a fluid inlet connection in communication with said passageway, a cylindrical sleeve spaced inwardly from the side wall and providing an inner boundary of said passageway, end closure plates having outer cylindrical surfaces for supporting engagement with the ends of said sleeve, a cylindrical second sleeve spaced inwardly from said first sleeve, said end closure plates having cylindrical surfaces concentric with but spaced axially from said outer cylindrical surfaces with which the ends of said second sleeve are in engagement, said end closure plates having bearings therein providing a fluid flow path, the space between said sleeves and said plates providing a motor stator chamber and the space in the interior of said inner sleeve providing a motor rotor chamber connected with said fluid flow paths, a pump housing connected to said motor housing and closing said second end, said pump housing having an impeller chamber and a fluid delivery connection connected to said impeller chamber, said pump housing having a fluid chamber therein with which said second passageway and said impeller chamber are in communication, a holding member mounted in said fluid chamber and engaging one of said closure plates, and a shaft carried by said bearings having a motor rotor thereon in said motor rotor chamber and a fluid impeller in said impeller chamber.

3. A motor driven pump as defined in claim 2 in which the holding member comprises a plate with a central opening in closely spaced relation to an axial portion of said fluid impeller.

4. A motor driven pump as defined in claim 2 in which the fluid impeller has an axial collar with a central fluid opening communicating with said fluid chamber and the holding member comprises a transverse plate forming a boundary of said impeller chamber and has an inner margin in closely spaced relation to said collar.

5. A motor driven pump comprising a motor housing having a side wall, a first end and a second end, said side wall having a plurality of ribs extending inwardly therefrom, a wall connecting a pair of said ribs to provide a passageway towards said first end, a fluid inlet connection in communication with said passageway, a cylindrical sleeve spaced inwardly from the side wall and in engagement with inner faces of said ribs and providing with said side wall a second passageway for fluid flow from said first end, end closure plates having outer cylindrical surfaces for supporting engagement with the ends of said sleeve, a second cylindrical sleeve spaced inwardly from said first sleeve, said end closure plates having cylindrical surfaces concentric with but spaced axially from said outer cylindrical surfaces with which the ends of said second sleeve are in engagement, said end closure plates having bearings therein each providing a fluid flow path, the space between said sleeves and said plates providing a motor stator chamber and the space in the interior of said inner sleeve providing a motor rotor chamber connected with said fluid flow paths, a pump housing connected to said motor housing and closing said second end, said pump housing having an impeller chamber and a fluid delivery connection connected to said impeller chamber, said pump housing having a fluid chamber therein with which said second passageway and said impeller chamber are in communication, and a shaft journaled in said bearings having a motor rotor thereon in said motor rotor chamber and a fluid impeller in said impeller chamber.

6. A motor driven pump comprising a motor housing having a side wall, a first end and a second end, said side wall having a plurality of ribs extending inwardly therefrom, a wall connecting a pair of said ribs to provide a passageway towards said first end, a fluid inlet connection in communication with said passageway, a cylindrical sleeve spaced inwardly from the side wall and in engagement with inner faces of said ribs and providing with said side wall a second passageway for fluid flow from said first end, end closure members having outer cylindrical surfaces for supporting engagement with the ends of said sleeve, said sleeve having a motor stator therein and a motor rotor within said motor stator, a pump housing connected to said motor housing and closing said second end, said pump housing having an impeller chamber and a fluid delivery connection connected to said impeller chamber, said pump housing having a fluid chamber therein with which said second passageway and said impeller chamber are in communication, a shaft having a motor rotor thereon in said motor rotor chamber and having an end portion extending exteriorly of said motor rotor chamber, and a fluid impeller on said shaft in said impeller chamber.

7. A motor driven pump comprising a motor housing having a side wall, a first end and a second end, said side wall having a plurality of ribs extending inwardly therefrom, said wall having a passageway therein extending towards said first end, a fluid inlet connection in communication with said passageway, a cylindrical sleeve spaced inwardly from the side wall and in engagement with inner faces of said ribs and providing with said side wall a second passageway for fluid flow from said first end, end closure members having outer cylindrical surfaces for supporting engagement with the ends of said sleeve, sealing members interposed between said closure members and the interior wall of said sleeve at said surfaces, a second cylindrical sleeve spaced inwardly from said first sleeve, said end closure members having inward extensions with cylindrical surfaces concentric with said outer cylindrical surfaces and with which the ends of said second sleeve are in engagement, sealing members interposed between said extensions and the interior wall of said second sleeve at said second mentioned surfaces, the space between said sleeves and said plates providing a motor stator chamber and the space in the interior of said inner sleeve providing a motor rotor chamber, a pump housing connected to said motor housing and closing said second end, said pump housing having an impeller chamber and a fluid discharge connection connected to said impeller chamber, said pump housing having a fluid chamber therein with which said second passageway and said impeller chamber are in communication, and a shaft having a motor rotor thereon in said motor rotor chamber and a fluid impeller in said impeller chamber.

8. A motor driven pump as defined in claim 7 in which the inward extensions have bearings mounted therein in which said shaft is journaled, and said bearings provide fluid flow paths in communication with the motor rotor chamber.

9. A motor driven pump comprising a motor housing having a side wall, a first end and a second end, said side wall having a plurality of ribs extending inwardly therefrom, said side wall having a passageway therein extending towards said first end, a fluid inlet connection in communication with said passageway, a cylindrical sleeve spaced inwardly from the side wall and in engagement with inner faces of said ribs and providing with said side wall a second passageway for fluid flow from said first end, end closure members having outer cylindrical surfaces for supporting engagement with the ends of said sleeve, one of said closure members being in spaced relation to said first end to provide a fluid chamber connecting said first and second passageways, said sleeve having a motor stator chamber therein and a motor rotor chamber within said motor stator chamber, a pump housing connected to said motor housing and closing said second end, said pump housing having an impeller chamber and a fluid discharge connection connected to said impeller chamber, said pump housing having a fluid chamber therein with which said second passageway and said impeller chamber are in communication, a holding member mounted in said fluid chamber and engaging the other of said closure members, and a shaft having a motor rotor thereon in said motor rotor chamber and a fluid impeller in said impeller chamber.

10. A motor driven pump comprising a motor housing having a side wall, a first end and a second end, said side wall having a plurality of ribs extending inwardly therefrom, a wall connecting a pair of said ribs to provide a passageway towards said first end, a fluid inlet connection in communication with said passageway, a cylindrical sleeve spaced inwardly from the side wall and in engagement with inner faces of said ribs and providing with said side wall a second passageway for fluid flow from said first end, end closure plates having outer cylindrical surfaces for supporting engagement with the ends of said sleeve, one of said closure plates being spaced inwardly from said first end to provide a fluid chamber connecting said first and second passageways, sealing members interposed between peripheral portions of said end closure plates and the interior wall of said sleeve at said surfaces, said end closure plates having inward extensions with cylindrical surfaces concentric with said outer cylindrical surfaces, a second cylindrical sleeve carried by said extension surfaces and spaced inwardly from said first sleeve, sealing members interposed between peripheral portions of said extensions and the interior wall of said second sleeve at said extension surfaces, the space between said sleeves and said plates providing a motor stator chamber and the space in the interior of said inner sleeve providing a motor rotor chamber, bearings supported by said extensions each providing a flow path connected to said motor rotor chamber, a pump housing connected to said motor housing and closing said second end, said pump housing having an impeller chamber and a fluid discharge connection connected to said impeller chamber, said pump housing having a fluid chamber therein with which said second passageway and said impeller chamber are in communication, and a shaft journaled in said bearings having a motor rotor thereon in said motor rotor chamber and a fluid impeller in said impeller chamber.

References Cited in the file of this patent

FOREIGN PATENTS 488,444     Canada _____ Nov. 25, 1952